United States Patent
Halberstadt et al.

(10) Patent No.: US 7,250,222 B2
(45) Date of Patent: Jul. 31, 2007

(54) LAYER SYSTEM

(75) Inventors: Knut Halberstadt, Mülheim an der Ruhr (DE); Werner Stamm, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 64 days.

(21) Appl. No.: 10/536,486

(22) PCT Filed: Oct. 30, 2003

(86) PCT No.: PCT/EP03/12095

§ 371 (c)(1),
(2), (4) Date: May 20, 2005

(87) PCT Pub. No.: WO2004/045844

PCT Pub. Date: Jun. 3, 2004

(65) Prior Publication Data

US 2006/0051608 A1 Mar. 9, 2006

(30) Foreign Application Priority Data

Nov. 21, 2002 (EP) .................... 02026012

(51) Int. Cl.
*B32B 5/30* (2006.01)
*B32B 15/04* (2006.01)
*B32B 15/20* (2006.01)
*C23C 4/08* (2006.01)
*C23C 24/00* (2006.01)

(52) U.S. Cl. .............. 428/612; 428/215; 428/220; 428/332; 428/680; 428/681; 427/205; 427/328; 427/448; 427/455; 427/456

(58) Field of Classification Search ............. 428/546, 428/548, 559, 612, 615, 678, 680, 681, 685, 428/632, 215, 213, 216, 220, 332, 334, 609, 428/633; 427/446, 448, 455, 456, 202, 203, 427/205, 256, 328, 383.3, 419.1
See application file for complete search history.

(56) References Cited

U.S. PATENT DOCUMENTS

| 4,152,223 A | 5/1979 | Wallace et al. |
| 4,789,441 A | 12/1988 | Foster et al. |
| 5,057,379 A | 10/1991 | Fayeulle et al. |

(Continued)

FOREIGN PATENT DOCUMENTS

EP 0 315 122 A2 5/1989

(Continued)

Primary Examiner—Michael E. Lavilla

(57) ABSTRACT

A system for bonding layers (1) of different chemical compositions, such as bonding a thermal barrier layer to a metal substrate on a surface of a gas turbine component. A substrate (4) made either of a ceramic material or particularly of a metal super-alloy may be bonded to an outer layer (16) such as a ceramic by means of a fine-grained intermediate layer (7) bonded to the substrate (4), and a coarse-grained layer (10) bonded to the intermediate layer (7) to create a studded surface (9). The fine and coarse layers (7, 10) provide a transition between the substrate (4) and the outer layer (16) for improved bonding between them. The studded surface (9) may provide at least a 20% increase in bonding surface area for the outer layer (16). Additionally, a medium-grained layer (13) may be applied to the studded surface (9) before applying the outer layer(16).

14 Claims, 1 Drawing Sheet

U.S. PATENT DOCUMENTS

| | | |
|---|---|---|
| 5,579,534 A | 11/1996 | Itoh et al. |
| 5,894,053 A | 4/1999 | Fried |
| 5,906,895 A | 5/1999 | Hamada et al. |
| 5,952,110 A | 9/1999 | Schell et al. |
| 6,440,499 B1 | 8/2002 | Wydra et al. |
| 6,444,331 B2 | 9/2002 | Ritter et al. |
| 2002/0076571 A1 | 6/2002 | Johnson et al. |
| 2002/0168537 A1 | 11/2002 | Hasz et al. |
| 2002/0187336 A1* | 12/2002 | Khan et al. .................. 428/323 |

FOREIGN PATENT DOCUMENTS

| | | |
|---|---|---|
| EP | 0 443 877 A1 | 8/1991 |
| EP | 0 783 043 A1 | 7/1997 |
| EP | 0 921 209 A2 | 6/1999 |
| EP | 1 050 663 A2 | 11/2000 |
| EP | 1 260 608 A1 * | 11/2002 |

* cited by examiner

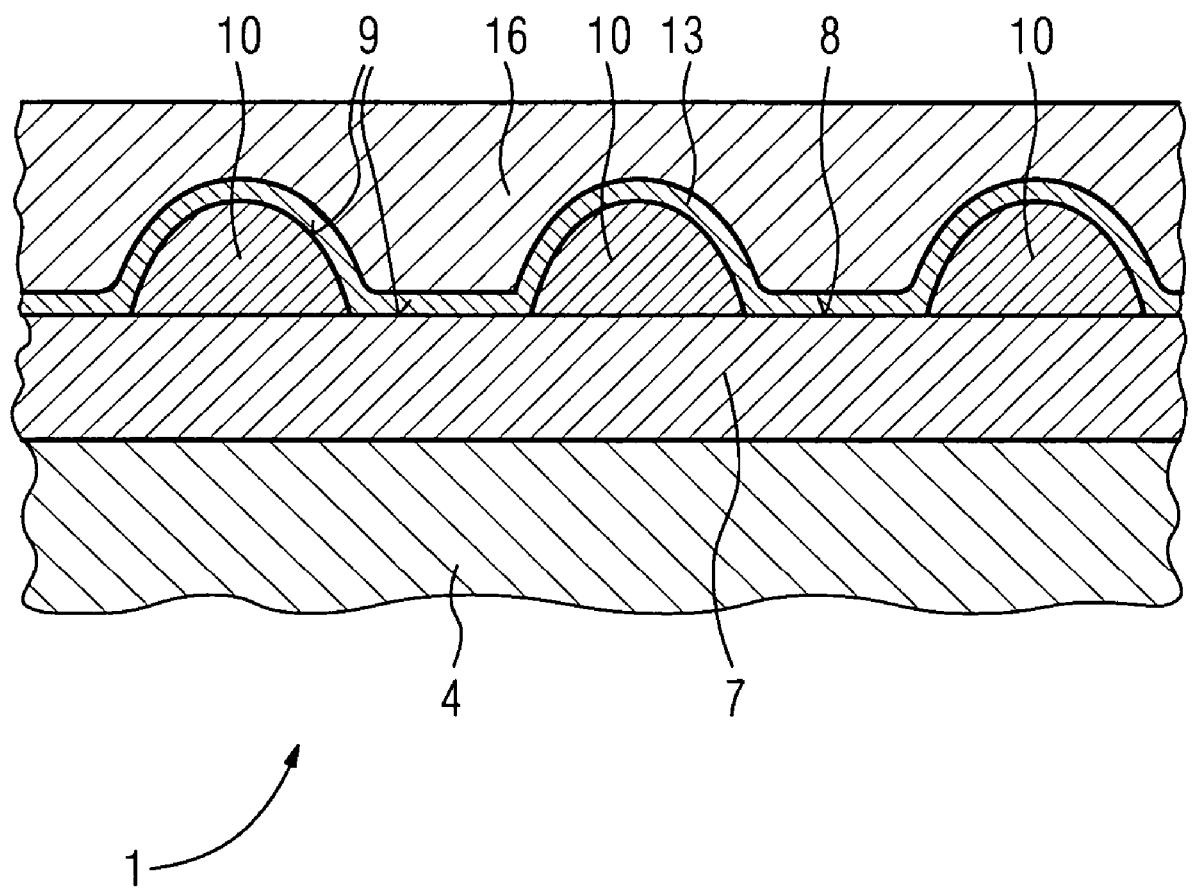

LAYER SYSTEM

CROSS REFERENCE TO RELATED APPLICATION

This application is the US National Stage of International Application No. PCT/EP2003/012095, filed Oct. 30, 2003 and claims the benefit thereof. The International Application claims the benefits of European Patent application No. 02026012.1 EP filed Nov. 21, 2002, both of the applications are incorporated by reference herein in their entirety.

FIELD OF THE INVENTION

The invention relates to a layer system in accordance with the preamble of the claims.

BACKGROUND OF THE INVENTION

U.S. Pat. No. 5,952,110 discloses a layer system in which coarse particles are present in an outer layer. The coarse particles project out of the outer surface and serve to increase the abrasive resistance. The coarse particles have a different chemical composition than the layer.

U.S. Pat. No. 5,579,534 discloses a layer system which includes at least three layers and in which coarse particles are arranged on a layer of finer particles.

U.S. Pat. No. 6,444,331 shows a bonding layer which has been roughened in order to achieve improved bonding of thermal barrier coating and bonding layer.

However, layer systems still suffer from poor bonding of the layers to one another or of the layer to a substrate.

SUMMARY OF THE INVENTION

Therefore, it is an object of the invention to overcome this problem.

The object is achieved by a layer system in accordance with the claims.

Further advantageous configurations of the layer system are listed in the subclaims. The advantageous configurations of the subclaims can be combined with one another.

BRIEF DESCRIPTION OF THE DRAWING

The FIGURE shows an exemplary embodiment of a layer system 1 according to the invention.

DETAILED DESCRIPTION OF THE INVENTION

A layer system 1 comprises a substrate 4 which consists, for example, of a ceramic or metallic material, in particular of a cobalt- or nickel-based superalloy.

An intermediate layer 7 is arranged on the substrate 4. This intermediate layer in particular has a high density and, in the case of the superalloy as substrate 4, consists of the composition of type MCrAlY (M=Fe, Co, Ni).

The microstructure of the intermediate layer 7 at least partially has fine particles (fine grain size) or has been at least partially produced from particles of a fine grain size. The term fine grain size means grain diameters of less than 22 micrometers, in particular between 8 and 22 micrometers. The proportion of particles of a fine grain size used in the production of the intermediate layer 7 is, for example, 50%. In particular, the particles of a fine grain size allow the production of a dense intermediate layer 7.

The particles for the intermediate layer 7 have, for example, grain diameters of between 8 and 44 micrometers.

The intermediate layer 7 may have been produced in various ways: chemical vapor deposition (CVD), plasma spraying (APS, LPPS, VPS, etc.), high velocity oxyfuel (HVOF) or other coating methods.

As far as possible a single layer of very coarse-grained spray material 10 has been applied to the outer surface 8 of the intermediate layer 7, the grain diameters being, for example, greater than 80 micrometers, in particular greater than 100 micrometers. This forms a studded surface.

In the case of plasma spraying, the plasma spraying installation is, for example, set in such a way that only a surface region of the coarse grains 10 melts in order to allow bonding of the coarse grains 10 to the intermediate layer 7. The coarse grains 10 have a composition, for example, of type MCrAlY.

It is also possible for the outer surface 8 of the intermediate layer 7 to be heated or melted, i.e. this surface is soft, so that when coarse particles 10 come into contact with it, in particular at a high velocity, these particles penetrate into the intermediate layer 7 and are anchored in place there.

It is also possible to enable coarse particles 10 to grow on the surface 8, for example by local growth, by growth nuclei being locally distributed over the surface 8 or by the surface being excited in such a way that growth conditions are only produced where the surface is excited.

The bonding surface 9 which is formed by the intermediate layer 7 and the coarse particles 10 is significantly larger than the outer layer of the still uncoated surface 8 of the intermediate layer 7.

Optionally, a further thin layer 13 (for example 40 to 80 micrometers thick) of a spray material of medium-coarse grains (mean grain size: 22 to 62 micrometers) is optionally applied using known methods to the structure of intermediate layer 7 and coarse particles 10 produced in this way.

The enlarged bonding surface 9 is retained. On account of the bonding surface 9, having an area which is preferably at least 20% greater, a better bonding strength of the outer layer 16 to the layer system 1 is achieved.

By way of example, the layer 13 has a composition of the type MCrAlY.

The coarse particles 10 and the medium particles 13 of the layer 13 can be applied by atmospheric plasma spraying (APS), low-pressure plasma spraying (LPPS), vacuum plasma spraying (VPS), cold gas spraying or spray compacting.

An outer layer 16 is applied to the layer 13.

The outer layer 16 is, for example, a ceramic layer, and when used for turbine components, in particular for gas turbine components, the outer layer 16 is a thermal barrier coating.

The invention claimed is:

1. A layer system, comprising:
   a substrate comprising an outer surface;
   an intermediate layer comprising a composition of MCrAlY at least partly comprising grain diameters less than 22 micrometers, the intermediate layer applied to the outer surface of the substrate;
   a coarse-grained layer comprising a composition of MCrAlY with particle diameters greater than 80 micrometers, the coarse-grained layer applied as substantially a single layer of particles on the fine-grained layer, forming a studded bonding surface with at least 20% more surface area than the outer surface of the substrate; and an outer ceramic layer applied to the studded bonding surface;

wherein the M in MCrAlY represents an element selected from the group consisting of iron, cobalt, and nickel.

2. The layer system as claimed in claim 1, wherein a further layer between 40 and 80 micrometers thick comprising a composition of MCrAlY with a mean grain diameter between 22 and 62 micrometers, is sprayed onto the studded bonding surface prior to the application of the outer layer, wherein the M in MCrAlY represents an element selected from the group consisting of iron, cobalt, and nickel.

3. The layer system as claimed in claim 1, wherein approximately 50% of the grain diameters in the intermediate layer are between 8 and 22 micrometers.

4. The layer system as claimed in claim 1, wherein the intermediate layer is dense.

5. The layer system as claimed in claim 1, wherein the substrate is a cobalt- or nickel-based superalloy.

6. The layer system as claimed in claim 1, wherein the outer layer is a thermal barrier coating.

7. The layer system as claimed in claim 1, wherein the intermediate layer is applied by plasma spraying.

8. The layer system as claimed in claim 1, wherein the layer system is a gas turbine part.

9. The layer system as claimed in claim 1, wherein the particles have diameters greater than 100 micrometers.

10. A method of forming a layered wall of a gas turbine component, the method comprising:

applying an intermediate layer of MCrAlY comprising a grain size distribution between 8 and 44 micrometers to an outer surface of a metallic substrate;

applying a substantially single layer of MCrAlY particles greater than 80 micrometers in diameter to the intermediate layer, forming a particle-studded bonding surface on the intermediate layer with at least 20% greater surface area than the outer surface of the substrate;

and applying a ceramic thermal barrier layer to the particle-studded bonding surface;

wherein the M in MCrAlY represents an element selected from the group consisting of iron, cobalt, and nickel.

11. The method of claim 10, wherein approximately half of the grain sizes in the intermediate layer grain size distribution are less than 22 micrometers.

12. The method of claim 10, wherein the substantially single layer of MCrAlY particles are applied to the intermediate layer by a plasma spray process that melts only a surface region of the particles to allow bonding of the particles to the intermediate layer.

13. The method of claim 10, wherein a surface portion of the intermediate layer is heated to a soft condition, and the MCrAlY particles are sprayed onto said surface portion of the intermediate layer at sufficient velocity that the MCrAlY particles penetrate into said surface portion of the intermediate layer, and are anchored therein.

14. The method of claim 10, further comprising applying a spray material comprising a mean grain size of 22-62 micrometers in a layer 40 to 80 micrometers thick on the particle-studded bonding surface prior to applying the ceramic thermal barrier layer thereto.

* * * * *